(12) United States Patent
Kyriakides et al.

(10) Patent No.: US 8,803,344 B2
(45) Date of Patent: Aug. 12, 2014

(54) RENEWABLE ENERGY STORAGE AND CONVERSION SYSTEM

(76) Inventors: Elias Kyriakides, Nicosia (CY); Zenon Achillides, Chloraka (CY)

( * ) Notice: Subject to any disclaimer, the term of this patent is extended or adjusted under 35 U.S.C. 154(b) by 236 days.

(21) Appl. No.: 13/505,931

(22) PCT Filed: Nov. 4, 2010

(86) PCT No.: PCT/IB2010/002808
§ 371 (c)(1),
(2), (4) Date: May 3, 2012

(87) PCT Pub. No.: WO2011/055218
PCT Pub. Date: May 12, 2011

(65) Prior Publication Data
US 2012/0217760 A1   Aug. 30, 2012

(30) Foreign Application Priority Data
Nov. 4, 2009   (CY) .................................. 2009/00012

(51) Int. Cl.
| | |
|---|---|
| *F02B 63/04* | (2006.01) |
| *F03G 7/08* | (2006.01) |
| *H02K 7/18* | (2006.01) |
| *H02J 3/38* | (2006.01) |
| *H02J 3/42* | (2006.01) |
| *F03D 9/02* | (2006.01) |
| *H02J 15/00* | (2006.01) |
| *H02J 1/00* | (2006.01) |

(52) U.S. Cl.
CPC ................. *H02J 15/00* (2013.01); *Y02E 70/10* (2013.01); *H02J 3/387* (2013.01); *H02J 3/42* (2013.01); *H02J 3/386* (2013.01); *F03D 9/02* (2013.01); *Y02E 10/725* (2013.01); *F05B 2220/61* (2013.01); *Y02E 70/30* (2013.01); *Y02E 10/763* (2013.01); *H02J 2001/004* (2013.01); *Y02E 70/20* (2013.01)
USPC ........................................................ 290/1 R

(58) Field of Classification Search
CPC ............ F03D 9/02; H02J 3/387; H02J 15/00; H02J 2001/004; H02J 3/386; H02J 3/42; F05B 2220/61; Y02E 70/10; Y02E 70/30; Y02E 10/725; Y02E 10/763; Y02E 70/20; H02K 57/00
USPC ..................................................... 290/1 R, 2
See application file for complete search history.

(56) References Cited

U.S. PATENT DOCUMENTS

| | | | |
|---|---|---|---|
| 4,084,038 A | 4/1978 | Scragg | |
| 4,360,766 A * | 11/1982 | Bogardus, Jr. ................ | 318/139 |

(Continued)

FOREIGN PATENT DOCUMENTS

| | | | |
|---|---|---|---|
| GB | 1590375 | * | 6/1981 |
| GB | 2263734 | * | 8/1993 |
| GB | 2286717 | * | 8/1995 |

OTHER PUBLICATIONS

Z.Chen; "Grid Power Quality with Variable Speed Wind Turbines"; IEEE Transactions on Energy Conversion, vol. 16, No. 2, Jun. 2001.
F.D. Kanellos et al.; "The Effect of Variable-Speed Wind Turbines on the Operation of Weak Distribution Networks"; IEEE Transactions on Energy Conversion, vol. 17, No. 4, Dec. 2001.

*Primary Examiner* — Javaid Nasri
(74) *Attorney, Agent, or Firm* — Abelman, Frayne & Schwab

(57) ABSTRACT

The invention consists of a system for generating regulated and controllable AC electricity from renewable sources of energy that are intermittent in their power output. The whole configuration comprises a renewable energy source and an appropriate conversion mechanism, an electrolyzer to produce hydrogen from water, a hydrogen storage tank, fuel cells to generate DC electricity using hydrogen as the fuel, and an electromechanical energy conversion system, comprising a DC motor in series with an AC generator to convert the DC electricity output of the fuel cells to controllable, regulated, harmonics-free AC output, directly connected to the power system grid. Other features of the system include the capability to modify the system, so as to generate electricity from natural gas, propane and hydrogen that was produced by off-peak electricity.

12 Claims, 2 Drawing Sheets

(56) References Cited

U.S. PATENT DOCUMENTS

| | | | |
|---|---|---|---|
| 5,121,044 A | 6/1992 | Goldman | |
| 5,455,884 A * | 10/1995 | Yang | 388/803 |
| 5,479,293 A * | 12/1995 | Reed | 359/432 |
| 7,233,079 B1 | 6/2007 | Cooper | |
| 7,444,189 B1 * | 10/2008 | Marhoefer | 700/26 |
| 2007/0079611 A1 * | 4/2007 | Doland | 60/495 |
| 2007/0290636 A1 * | 12/2007 | Beck et al. | 318/106 |

\* cited by examiner

RENEWABLE ENERGY STORAGE AND CONVERSION SYSTEM

CROSS-REFERENCE TO RELATED APPLICATIONS

This application is a National Phase of PCT/IB2010/002808, filed on Nov. 4, 2010, which claims priority from Cyprus Application No. 2009/00012, filed Nov. 4, 2009, the disclosures of which are incorporated herein by reference.

TECHNICAL FIELD

This invention relates to a renewable electric energy generation method that can produce regulated and controllable electrical energy from renewable sources of energy.

BACKGROUND ART

Electric power systems rely mainly on fossil fuels to cover the electricity demand, since electricity generation from fossil fuels is a proven, reliable technology and the electrical output from steam and gas turbine generators is regulated. However, fossil fuels are exhaustible, costly, and cause environmental problems, such as the emission of gases to the atmosphere. In a number of countries there are alternative methods of electricity generation that are equally reliable, such as hydro and biomass electricity generation or nuclear generation. However, not all countries have these natural resources and/or the adequate technology to develop this type of power plants.

There is a trend in developing new methods of electricity generation, mainly from renewable sources, such as wind and solar energy. These forms of renewable energy cannot be harnessed effectively due to a number of problems, such as the variability of wind and solar radiation, the need to use expensive inverters to transform direct current (DC) electricity to alternating current (AC) electricity, low efficiencies of photovoltaic panels, and the insertion of harmonics into the power grid [Z. Chen and E. Spooner, "Grid power quality with variable speed wind turbines," IEEE Trans. on Energy Conversion, vol. 16, no. 2, June 2001, pp. 148-154], [F. D. Kanellos and N. D. Hatziargyriou, "The effect of variable-speed wind turbines on the operation of weak distribution networks," IEEE Trans. on Energy Conversion, vol. 17, no. 4, December 2002, pp. 543-548], [R. L. Scragg and A. B. Parker, "Electrical power generation and storage system," U.S. Pat. No. 4,084,038, April 1978], [A. J. Goldman, "Electrical energy system," U.S. Pat. No. 5,121,044, June 1992], [W. Cooper, "Renewable energy electric power generating system," U.S. Pat. No. 7,233,079, June 2007].

The proposed method uses a connection of equipment, machines and technologies in a novel configuration, as explained below. The method is able to alleviate the operating problems of the aforementioned renewable sources and offer a reliable way of harvesting renewable energy. The proposed method is also able to feed the renewable energy into the electricity network, in synchronism with the traditional (e.g. fossil fuel) generators of the system. The proposed method can compete economically with the conventional methods and provide a stable, reliable and financially sound environmental alternative to electricity generation. The electromechanical system proposed, using a combination of a DC motor and an AC generator, replaces the expensive inverter that is currently used and that creates problems with harmonic voltages/currents in the network. The proposed method enables the development of renewable power plants of much higher rating, since the cost and size prohibitions of inverters, as well as their power quality problems, would no longer be an issue. Further, with this method there is no longer a need of elaborate control mechanisms to control the frequency of the electricity output of wind turbines, as the wind turbines will be used for the production of hydrogen and will not be connected directly to the grid.

There is a continuing need for harvesting renewable energy without endangering the stability of the grid and the continuity of the supply.

INDUSTRIAL APPLICABILITY

The method described in this document is intended to be widely used for generating regulated and controllable electricity from renewable energy sources. The method can be used to convert unregulated, variable electrical energy from any type of renewable energy sources, such as wind energy and solar energy into regulated and controllable AC electrical energy for connecting directly onto the power system grid.

The method can also be used with natural gas or propane as the primary fuel directly connected to the input of the fuel cells. This configuration enables the use of the method with fossil fuel input, thus giving the advantage that (a) natural gas or propane may be used in periods when hydrogen production is low, (b) natural gas or propane may be used as a stand-alone system operating directly from non-renewable sources, and (c) combined cycle gas turbines will be avoided, thus minimizing $CO_2$ and $NO_x$ emissions into the atmosphere.

The method can also be used to generate cheaper electricity from electric energy produced during off-peak periods (e.g. nights). During off-peak periods, coal and oil based power stations work below rating; if they operate at rated output, the excess energy can be converted into hydrogen, and hydrogen may be used during on-peak periods using this method to generate electricity, thus avoiding the connection to the grid of expensive generating units, such as diesel generators. The hydrogen will be produced as explained in the description below, by operating some elements in the reverse mode. The overall effect will be lower $CO_2$ emissions and considerable savings in electricity cost.

ADVANTAGEOUS EFFECTS OF THE INVENTED METHOD

A particular benefit of the present invention is that the output power will not contain any harmonics that are mainly associated with the intermittency of the wind or solar activity and with the inverters used to convert DC to AC electricity.

Moreover, the present invention may be used to level the load curve of a power system and enable savings for electric utilities. The system is a fast start unit, since there is no need for boilers to warm up or for any special preparations. Thus, it may be used as a peaking unit and in emergencies.

Another important benefit of the present invention is that the spinning reserve (that is always used if wind farms are connected to the grid) will be minimized since the output power of the proposed system is regulated, predictable and controllable. Thus, there will be considerable savings both in $CO_2$ and $NO_x$ emissions as well as in the generation cost. Unit commitment and economic dispatch of electricity generating units will also be performed more accurately.

Furthermore, the reactive power absorption requirements from the grid from the induction generators that are commonly used in wind turbines will be eliminated, since the wind turbines will not be connected directly to the power system grid. This leads to power quality benefits and to a reduction in power losses.

Moreover, the oxygen produced during the electrolysis of water may be stored and packaged in order to be used for industrial and medical applications. The heat produced during the chemical reaction in the fuel cells may be recovered and used in a pre-heater in thermal power plants (if they are located in the vicinity of the renewable power station described here) or used for heating the buildings in the renewable power station. Further, it can be used for heating the hydrogen bottles to permit easier extraction of hydrogen from the bottles. The water can be recovered and guided through a pipeline network back to the electrolyzer, so as to be used for electrolysis and minimize the losses of water resources.

In addition, less maintenance is needed for this apparatus than the traditional thermal power plants, due to the absence of turbines and boilers, which require periodic maintenance.

Last but not least, it is known that the connection of wind turbines and photovoltaic cells that can be connected directly to the grid is constrained, due to the possible problems of instability, power quality issues and the need to have additional spinning reserve from fossil fuel power stations. This invention allows an unlimited amount of energy (limited only by the ratings of the devices used and the renewable resources on location) to be generated from wind turbines and photovoltaic cells, since the electrical power injected into the system is regulated and controllable.

DISCLOSURE OF INVENTION

In accordance with the present invention, a method for generating controllable and regulated electrical energy from (a) renewable sources and (b) natural gas or propane is described. The method is based on the interconnection of several elements.

FIG. 1 illustrates a general embodiment of our electricity generation system. As shown, the system uses electricity produced from renewable energy sources (such as wind turbines, solar cells, etc.) to finally produce AC electricity that is regulated, controllable, and harmonics-free. The method is characterized by an arrangement of elements, comprising: (i) a renewable energy conversion system, including wind turbines (with a DC output (101), or with an AC output (102) coupled to an AC to DC converter (103)) and/or photovoltaic cells (104) and/or biomass boilers and/or other types of renewable energy generation technologies (105) which supply DC electricity to an electrolyzer (106) to obtain hydrogen from water through electrolysis; (ii) a hydrogen storage tank (107) to store the hydrogen produced; (iii) an arrangement of three separate series and parallel configurations of fuel cell modules (108*a*-108*d*; 108*e*-108*f*; 108*g*-108*h*) that are supplied with hydrogen from a hydrogen storage tank (107) and that have one output each (the number of fuel cells in each configuration depends on the voltage and power required); (iv) a DC motor (111), having a first input, arranged to receive the output of fuel cell configuration 108*a*-108*d* to its armature winding, and a second input, arranged to receive DC electricity to its field winding from the output of fuel cell configuration 108*e*-108*f* (also possible to have a connection, so as to receive rectified electricity from the output of the AC generator (113), once it is generating electricity, or rectified electricity from the power grid); (v) a single phase or a three phase AC generator (113) connected to the DC motor (111) through a shaft (112) and having an input arranged to receive DC electricity to its field winding from the output of fuel cell configuration 108*g*-108*h* (also possible to have a connection, so as to receive rectified electricity from its output, once it is generating electricity, or rectified electricity from the power grid); (vi) a step up voltage transformer to connect the output of the AC generator (113) to the power system grid; (vii) high voltage overhead or underground cables, to connect the AC generator (113) to the transformer primary, and, the transformer secondary to the power system grid; (viii) a circuit breaker that closes when the AC generator is ready to be synchronized to the grid; (ix) circuit breakers (109*a*-109*h*) and bypass diodes (110*a*-110*h*), to control the starting current of the DC motor, the excitation of the armature winding of the DC motor, the excitation of the field windings of the DC motor and AC generator, to improve the efficiency of the system at various output powers, and to protect the fuel cells in abnormal conditions; (x) protection and control devices for all electrical, mechanical, chemical and electrochemical parts of the apparatus.

There are three energy conversion stages in the system: (a) electrolysis is used to produce hydrogen from water using electricity from renewable energy sources, (b) fuel cells use the hydrogen to produce DC electricity, and (c) DC electricity is converted to AC electricity through a DC motor/AC generator configuration.

More specifically, wind turbines (elements 101 and 102), solar cells (element 104) or other types of renewable energy sources (element 105) are used in the configuration of FIG. 1 to generate electricity. The electricity produced may be either DC or AC. DC electricity may be used directly to perform electrolysis of water (element 106), while AC electricity can be converted to DC through an AC to DC converter (element 103) and then used to perform electrolysis of water. Element 106 is the electrolyzer, which produces hydrogen and oxygen. The hydrogen is stored in hydrogen storage tanks (element 107), while the oxygen may be released into the atmosphere or stored for industrial and medical applications. In addition, there is also the possibility to transport hydrogen produced elsewhere by renewable or non renewable sources of energy and stored in the hydrogen storage tank (element 107).

The hydrogen is guided into the fuel cell modules shown as elements 108*a*-108*h* through a network of pipes. Each fuel cell module contains a number of fuel cells in. series and parallel arrangements. The number of fuel cell modules used is proportional to the desired electric power output of the system. The fuel cell modules shown in FIG. 1 are generic, both in type and in number. The number of fuel cells used depends on their individual power rating and on the total power output required. In the fuel cells, a chemical reaction takes place: hydrogen reacts with oxygen (from the atmospheric air) and produces DC electricity, heat and water. The heat produced by the fuel cells may be recovered and used in a pre-heater in thermal power plants or used for heating the buildings in the renewable power station, or (if needed) for heating the hydrogen storage tanks to make the extraction of hydrogen easier. The water can be recovered and guided through a pipeline network back to the electrolyzer, so as to be used for electrolysis and minimize the losses of water resources.

The DC electricity from fuel cell modules 108*a*-108*d* (or a suitable number of such elements/modules depending on the type of the fuel cells and the desired electric power output) is used to power the armature winding of the DC motor (element 111), so as to create an electromagnet. The DC electricity from fuel cell modules 108*e*-108*f* (or a suitable number of such elements depending on the type of the fuel cells and the desired electric power output) is used to power the field winding of the DC motor (element 111), which produces a magnetic field. The interaction of the magnetic field in the field winding and the electromagnet in the armature winding creates a rotating torque which forces the shaft (element 112), coupling the DC motor (element 111) to the AC generator (element 113) to rotate.

The shaft (element 112) drives the rotor of the three-phase AC generator (element 113) (which can also be single phase). Fuel cell modules 108g-108h (or a suitable number of such elements/modules depending on the type of the fuel cells and the desired electric power output) supply the field winding, which is located on the rotor of the AC generator (element 113) with DC current and a rotating magnetic field is thus created. The rotating magnetic field induces a voltage at the stator winding of the AC generator (element 113) and AC electricity is produced. The output voltage of the AC generator (element 113) depends on the field excitation and is thus controllable. For instance, the output voltage may be set at the level of the distribution voltage of the power grid of the area where the system is located and a step up transformer (element 116) may be used to increase the voltage level and connect the system to the transmission grid. Elements 115 and 117 of FIG. 1 are electric power cables that connect the system to the transmission grid through a step up transformer. Element 114 is a circuit breaker, which closes only when the AC generator is ready to be synchronized to the grid.

With reference to the above configurations for the DC motor and AC generator, an alternative arrangement included in this description is to tap a portion of the output power from the AC generator or the power system grid and use that power to energize the field windings of the DC motor and of the AC generator through separate circuits, in order to avoid the need for fuel cells 108e-108f and 108g-108h.

With reference to FIG. 1, there is also the option to connect a bypass diode of suitable rating in parallel to each fuel cell module or set of fuel cell modules 108a-108h (or a suitable number of such fuel cell modules that will be connected in series) and a circuit breaker in series with each fuel cell module or set of fuel cell modules 108a-108h (or a suitable number of such fuel cell modules that will be connected in series). In normal operation, the circuit breaker will be closed. The diode will thus be reversed biased and it will not be conducting. The bypass diode and the circuit breaker will be used for (a) soft starting of the DC motor, (b) smoother control of the DC motor during normal operating conditions, and (c) efficient operation of the system under different loading conditions. The operation of the bypass diode (elements 110a-110h) and the circuit breaker (elements 109a-109h) is explained below for all three cases.

For the case of soft starting, it is known that, during the procedure of starting up the DC motor from standstill, the DC motor (element 111) will demand a high amount of current from the fuel cell modules (between 2 to 10 times the rated full load current, depending on the type and size of the motor). This may possibly shorten the life of the fuel cells or even cause failure to start the DC motor. In order to avoid this problem, a number of circuit breakers (for example, half of the total number of circuit breakers) should be opened, thus creating a bypass path for current through the bypass diode. Consequently, the total voltage across the set of fuel cell modules 108a-108d will reduce proportionally to the number of circuit breakers opened. The reduced voltage will cause a reduced starting current, since the starting current is proportional to the voltage by a factor of $1/R_a$, where $R_a$ is the armature resistance of the DC motor. The described action will lead to a reduced starting torque (since the torque produced is proportional to the armature current), but this does not cause a problem, since the DC motor will be started at no-load conditions and only friction losses will need to be overcome by this starting torque. In the case of higher starting torque requirements, the additional starting torque can be supplied by increasing the current supply to the field winding of the DC motor (element 111), by increasing the output of fuel cell module 108e-108f (in conjunction with the control circuit of the field winding). Once the DC motor starts, the circuit breakers that have been opened will sequentially be closed to increase the voltage at the terminals of the fuel cell configuration 108a-108d, increasing the torque of the DC motor and enabling it to pick up load once it has reached synchronous speed (the speed at which the AC generator (element 113) will produce AC electricity at the frequency of the power system grid).

For the case of smoother control of the DC motor (element 111) (and eventually more controllable real power output from the AC generator) at normal operating conditions, the voltage across fuel cell modules 108a-108d can be increased or decreased, either by varying the supply of hydrogen or by opening or closing a number of circuit breakers across the fuel cell modules (or the combination of the two), depending on the amount of the real power that needs to be injected into the grid. This, in effect controls the voltage at the armature winding of the DC motor. When the torque of the DC motor needs to be decreased, a number of circuit breakers open, bypassing the corresponding fuel cell modules and decreasing the voltage across 108a-108d. When the torque of the DC motor needs to be increased, then if there are any open circuit breakers, a number of these can be closed, thus connecting the corresponding number of fuel cell modules in series to the existing configuration, increasing the voltage across fuel cell modules 108a-108d. It is important to mention that the fuel cell modules operate at their maximum efficiency at higher power ratings; this is the reason for keeping a number of fuel cells shorted through the bypass diode and the closed circuit breaker when they are not needed in the circuit (e.g. at light load conditions). This leads to an overall higher operating efficiency, even at lower power ratings. It should also be noted, that the main means of controlling the torque of the DC motor (element 111) is through controlling the voltage across its field winding (varying the voltage output from fuel-cell configuration 108e-108f in conjunction with the control circuit of the field winding). The aforementioned method of controlling the DC motor can be also achieved through varying the voltage across the armature winding and can be used in addition to the control of the field winding voltage to achieve full control of the DC motor from no-load to full-load operation.

The method shown in FIG. 1 is capable of producing regulated and controllable electric power. The output voltage level and the amount of reactive power injected to or absorbed by the power system grid are regulated by the appropriate excitation of the AC generator (element 113) by changing the output of the fuel cell configuration 108g-108h (in conjunction with the control circuit of the field winding). The active power output (injected into the power system grid) is controllable by changing the torque delivered to the shaft (element 112), which in turn is controlled by the output of the fuel cell modules 108a-108d and 108e-108f. The subsystem comprising elements 111, 112, and 113 alleviates the problems of harmonics created by inverters.

With reference to FIG. 1, there are two alternative starting arrangements (that can be used if desired) for the two machines: (a) starting with the help of an auxiliary motor and (b) starting in reverse mode. In the case of starting with the help of an auxiliary motor, electric power from the power system grid is used to start an AC single phase (or three phase) motor that is coupled to the DC motor (element 111). Once the DC motor reaches the desired speed, it is uncoupled from the AC motor and it is supplied by the fuel cells as explained earlier. In the case of starting in reverse mode, electric power from the power system grid is used to operate the AC machine (element 113) as an AC motor, which rotates the DC motor (element 111) through the shaft (element 112). Once the DC motor reaches the desired speed, the power from the grid is discontinued, and power from the fuel cells is supplied to both the DC motor (element 111) and AC generator (element 113), to maintain their rotational speed and continue their operation in the normal operating mode.

FIG. 2 illustrates a general embodiment of another electricity generation system where elements 101-107 are replaced by element 201, and elements 108a-107h by elements 202a-202h.

Element 201 is a storage tank, containing natural gas or an interconnected pipeline network carrying natural gas. Elements 202a-202h are natural gas fuel cell modules. Natural gas from element 201 flows to elements 202a-202h and DC electricity is produced. DC electricity is then used in the remaining part of the apparatus, in the same manner explained above for FIG. 1. This method enables the production of regulated and controllable electric power directly from natural gas. This configuration enables the use of the system with fossil fuel input, thus giving the advantages that (a) natural gas may be used as a prime fuel in periods when hydrogen production is low, (b) the invention may be used as a stand-alone system, operating directly from non-renewable sources, and (c) combined cycle gas turbines are avoided, thus minimizing $CO_2$ and $NO_x$ emissions into the atmosphere.

With reference to FIG. 2, the same system may be used, where element 201 is a storage tank containing propane or an interconnected pipeline network carrying propane. Elements 202a-202h are propane fuel cell modules. The system operates as explained in the case of natural gas.

With reference to FIGS. 1 and 2, the proposed method can coexist with thermal power plants; to improve their efficiency. The heat generated by the fuel cells during the electrochemical conversion can be recovered and used in a pre-heater in thermal power plants. The heat recovered may also be used for heating buildings or for heating water, or for heating the hydrogen storage tanks, to enable easier extraction of hydrogen in some types of storage tanks.

The method illustrated by FIG. 1 may be used to produce hydrogen by using off-peak electricity, which is cheaper than on-peak electricity. The ability of the elements of FIG. 1 to operate in reverse mode may be used. The AC generator will be operated as an AC motor; the DC motor will be operated as a DC generator; and the fuel cell modules 108a-108d will be operated as electrolyzers to produce hydrogen (provided they have the capability to be used in the reverse mode). Some examples of using fuel cells as electrolyzers are [J. K. Stedman, "Regenerative fuel cell," U.S. Pat. No. 3,981,745, September 1976] and [A. H. Levy, L. L. VanDine, and J. C. Trocciola, "Static regenerative fuel cell system for use in space," U.S. Pat. No. 4,839,247, June 1989].

Figure 1:
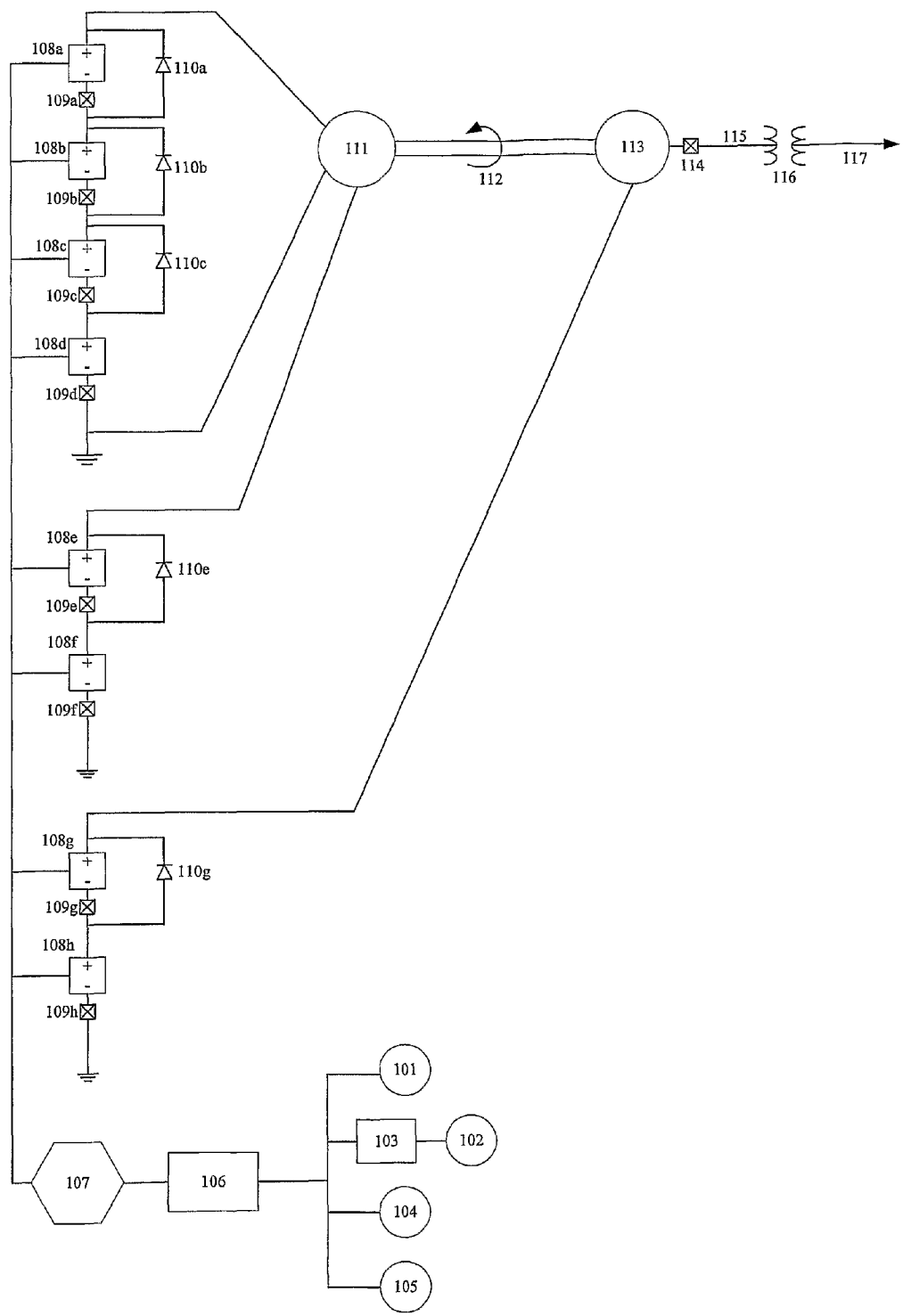
FIG. 1 shows a detailed embodiment of the arrangement and interconnection of the elements of the proposed method.
Figure 2:
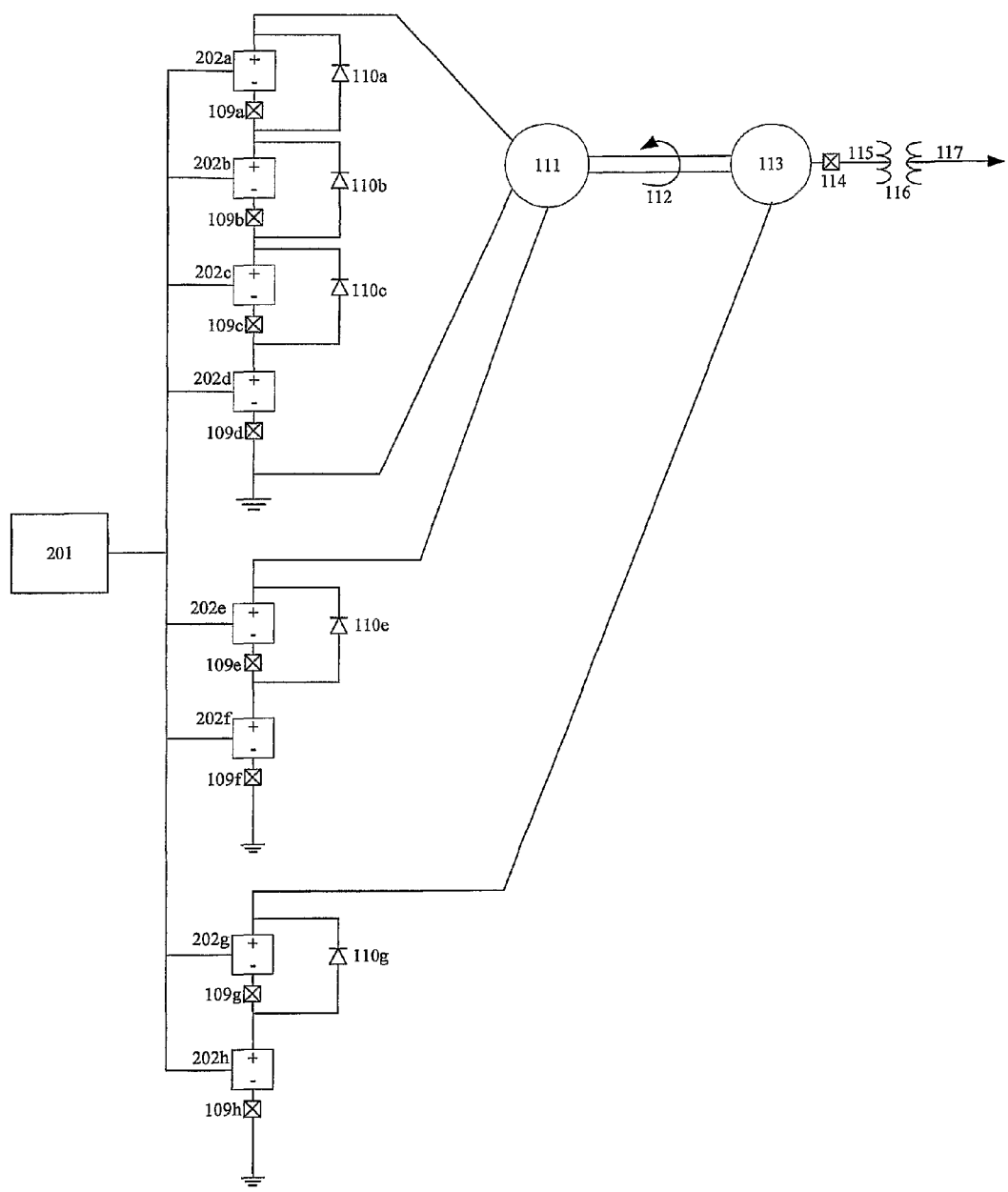
FIG. 2 shows an alternative arrangement in which natural gas or propane can be connected directly to the fuel cells and produce electricity.

The invention claimed is:

1. An electricity generation system using wind energy to supply power to an electric grid, the system comprising:
    a wind turbine energy source which supplies DC electricity to an electrolyzer through a converter to produce hydrogen from water through electrolysis;
    a hydrogen storage tank, to store the hydrogen produced;
    a first, second and third fuel cell module that are supplied with hydrogen from the hydrogen storage tank and that have one electrical output each, wherein each of the first, second, and third fuel cell modules comprises at least one fuel cell, one fuel cell bypass diode, and one fuel cell circuit breaker;
    a DC motor having an armature winding and a field winding, wherein the armature winding is energized by the electrical output of the first fuel cell module and the field winding is user-configurable such that it can be energized either by the electrical output of the second fuel cell module or by rectified electricity from the electric grid;
    a single phase or a three phase AC generator having a field winding, wherein the generator is mechanically connected to the DC motor through a shaft and wherein the field winding is user-configurable such that it can be energized either by the electrical output of the third fuel cell module or by rectified electricity from the electric grid;
    a step-up voltage transformer to connect the output of the AC generator to the electric grid;
    high voltage overhead or underground cables to connect the AC generator to the transformer primary and to connect the transformer secondary to the electric grid;
    a circuit breaker that closes when the AC generator is ready to be synchronized to the electric grid; and
    a controller configured to (a) monitor the first, second, and third fuel cell modules and control the current they supply to the DC motor and AC generator by switching the fuel cell circuit breakers based on the desired output power; (b) provide sufficient torque to start up and drive the DC motor and AC generator; (c) limit the destructive starting current drained by the DC motor; (d) synchronize and connect the system to the electric grid; and (e) smooth the loading/unloading rate of the fuel cells.

2. The electricity generation system according to claim 1, wherein the field winding of the DC motor receives electricity from the second fuel cell module.

3. The electricity generation system according to claim 2, wherein the field winding of the AC generator receives electricity from the third fuel cell module.

4. The electricity generation system according to claim 2, wherein the field winding of the AC generator receives rectified electricity from the electric grid.

5. The electricity generation system according to claim 1, wherein the field winding of the DC motor receives rectified electricity from the electric grid.

6. The electricity generation system according to claim 5, wherein the field winding of the AC generator receives electricity from the third fuel cell module.

7. The electricity generation system according to claim 5, wherein the field winding of the AC generator receives rectified electricity from the electric grid.

8. The electricity generation system according to claim 1, wherein the field winding of the AC generator receives electricity from the third fuel cell module.

9. The electricity generation system according to claim 1, wherein the field winding of the AC generator receives rectified electricity from the electric grid.

10. A method of operating a user-configurable electricity or hydrogen generation system, the method comprising:
providing an electricity or hydrogen generation system comprising:
a wind turbine energy source capable of supplying DC electricity to an electrolyzer through a converter to produce hydrogen from water through electrolysis;
a hydrogen storage tank;
a first, second and third fuel cell module capable of being supplied with hydrogen from the hydrogen storage tank and that have one electrical output each, wherein each of the first, second, and third fuel cell modules comprises at least one regenerative fuel cell, one fuel cell bypass diode, and one fuel cell circuit breaker;
a DC machine having an armature winding and a field winding;
a single phase or a three phase AC machine having a field winding, wherein the AC machine is mechanically connected to the DC machine through a shaft;
a voltage transformer to connect the AC machine to an electric grid;
high-voltage overhead or underground cables to connect the AC machine to the transformer primary and to connect the transformer secondary to the electric grid; and
a controller;
selecting to operate the electricity or hydrogen generation system either as an electricity generation system or as a hydrogen generation system,
wherein when the user selects to operate the electricity or hydrogen generation system as an electricity generation system:
the wind turbine energy source supplies DC electricity to the electrolyzer through the converter, the resulting hydrogen being stored in the hydrogen storage tank;
hydrogen from the hydrogen storage tank is supplied to the first, second and third fuel cell module;
the DC machine is operated as a DC motor, wherein the armature winding is energized by the electrical output of the first fuel cell module and the field winding is user-configured such that it is energized either by the electrical output of the second fuel cell module or by rectified electricity from the electric grid;
the DC machine drives the AC machine through the shaft, wherein the AC machine is operated as an AC generator and is user-configured such that its field winding is energized either by the electrical output of the third fuel cell module or by rectified electricity from the electric grid;
the electricity generated by the AC machine passes through the voltage transformer and high-voltage overhead or underground cables to the electric grid; and
the controller is configured to (a) monitor the first, second, and third fuel cell modules and control the current they supply to the DC machine and AC machine by switching the fuel cell circuit breakers based on the desired output power; (b) provide sufficient torque to start up and drive the DC machine and AC machine; (c) limit the destructive starting current drained by the DC machine; (d) synchronize and connect the system to the electric grid; and (e) smooth the loading/unloading rate of the fuel cells;

and wherein when the user selects to operate the electricity or hydrogen generation system as a hydrogen generation system:
electricity from the electric grid passes through the voltage transformer and high-voltage overhead or underground cables to the AC machine, which is operated as an AC motor, and which has its field winding energized by rectified electricity from the electric grid;
the AC machine drives the DC machine through the shaft, wherein the DC machine is operated as a DC generator, wherein the field-winding is energized by rectified electricity from the electric grid, and wherein electricity generated from the armature winding is fed to the first, second and third fuel cell modules;
the first, second and third fuel cell modules generate hydrogen that is stored in the hydrogen storage tank; and
the controller is configured to monitor the first, second, and third fuel cell modules.

11. The method of claim 10, wherein the user-configurable electricity or hydrogen generation system is operated as an electricity generation system.

12. The method of claim 10, wherein the user-configurable electricity or hydrogen generation system is operated as a hydrogen generation system.

* * * * *